April 3, 1934.  S. E. CAMPBELL  1,953,336
PROCESS OF REFINING OIL
Filed May 25, 1931   2 Sheets-Sheet 1
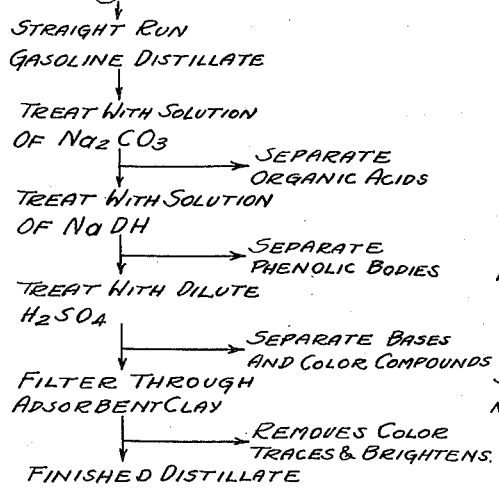
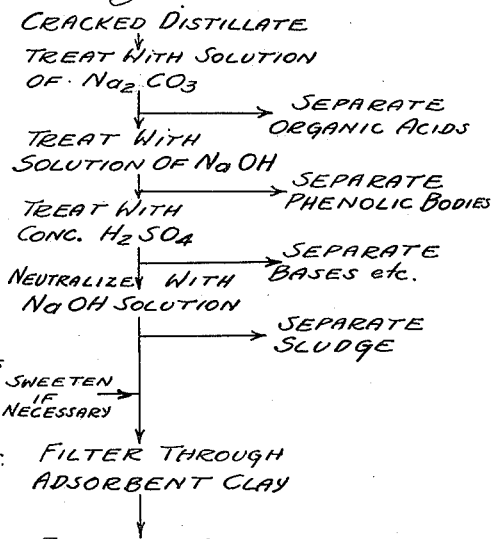
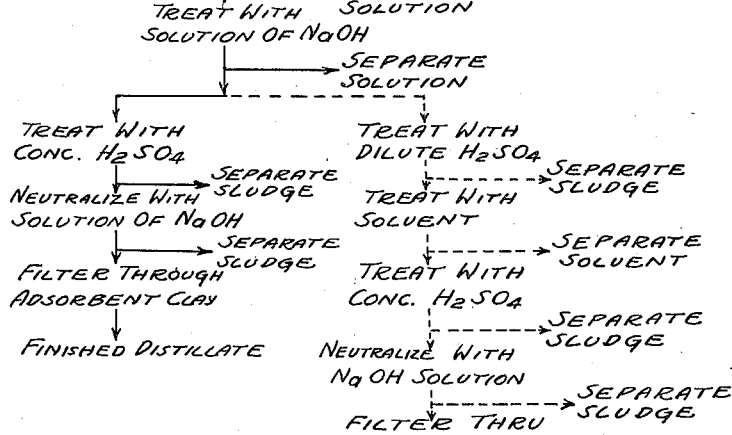
INVENTOR:
SUMNER E. CAMPBELL
by Charles L. Stode
ATTORNEY.

April 3, 1934.     S. E. CAMPBELL     1,953,336
PROCESS OF REFINING OIL
Filed May 25, 1931     2 Sheets-Sheet 2
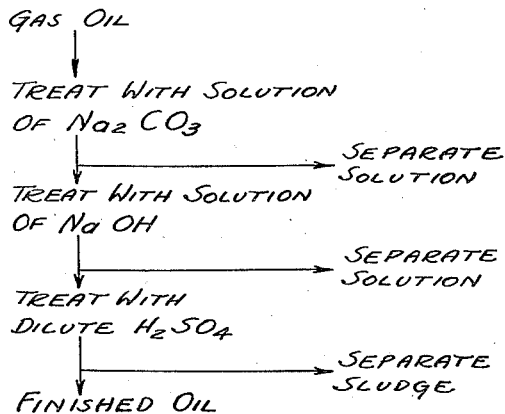
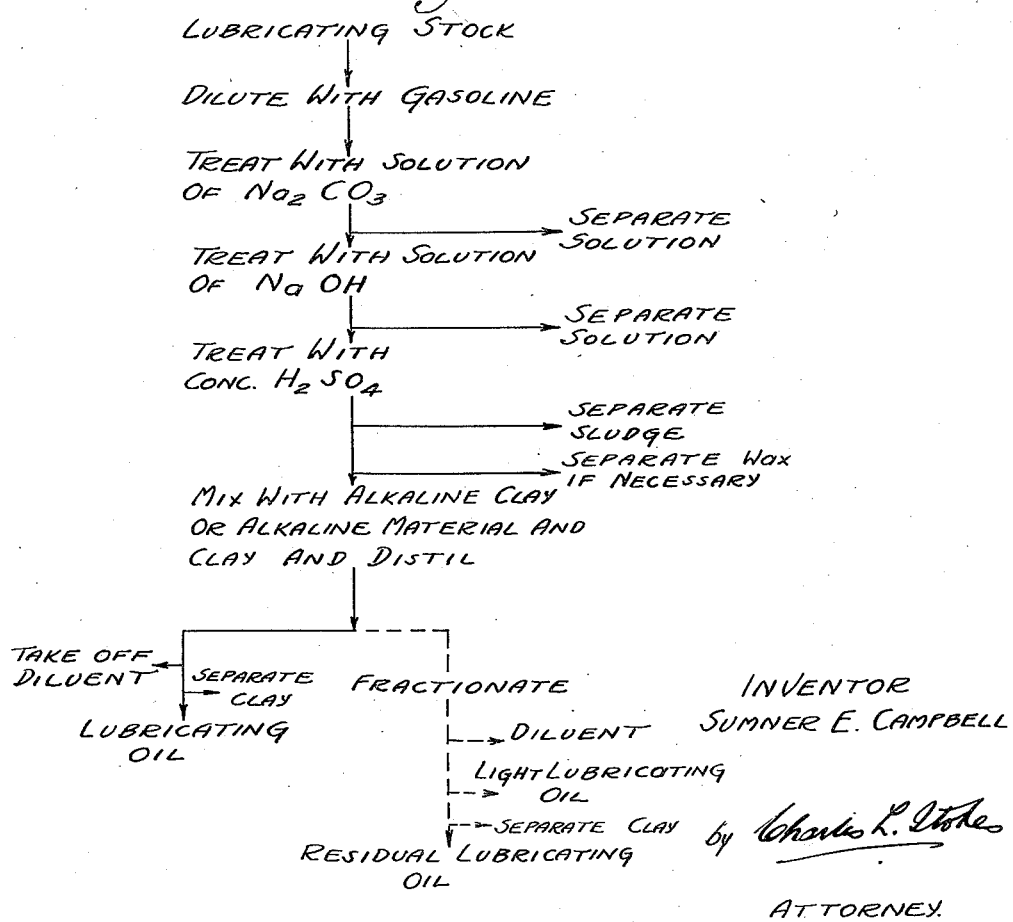
INVENTOR
SUMNER E. CAMPBELL
by Charles L. Stokes
ATTORNEY.

Patented Apr. 3, 1934

1,953,336

UNITED STATES PATENT OFFICE 1,953,336

PROCESS OF REFINING OIL

Sumner E. Campbell, Long Beach, Calif.

Application May 25, 1931, Serial No. 539,832

6 Claims. (Cl. 196—38)

This invention relates to refining various fractions derived from various crude petroleums, either paraffine or naphthene base crudes, and has for its particular object the selective removal of impurities from gasoline, cracked distillate, kerosene, gas oil, lubricating oil, and/or other fractions of crude petroleum.

Inasmuch as distillates from paraffine base oils do not contain the same impurities as found in naphthene base oils, or contain a less variety and/or quantity thereof, the treatments illustrated herein will be directed to the treatments of distillates obtained from naphthene base oils, such as California crudes, in preference to those obtained from paraffine base oils, such as Pennsylvania crudes, although I do not limit myself to the treatment of distillates from any particular crude oils, the paraffine base oils, as a rule, merely requiring less, or varied, steps in the herein described process.

Figs. 1 to 5 inclusive are diagrammatic flow sheets illustrating the treatment of various distillates and in Fig. 1 it will be seen that a straight run gasoline distillate from a California crude oil, which contains the largest amounts and variety of impurities to be removed, such as organic acids, phenols, nitrogenous bases, chromogenic compounds, etc., is first treated with a solution of a suitable carbonate, or bicarbonate, such as sodium carbonate ($Na_2CO_3$) or sodium bicarbonate ($NaHCO_3$), or any other carbonate solution, such as potassium carbonate solution, which solution readily reacts with organic acids in the distillate, such as naphthenic acids, said carbonate solution being a solution of any strength up to a saturated solution.

The phenols in general, being weakly acid bodies, are insoluble in carbonate solutions, and therefore any phenols in the oil will remain therein while the carbonate solution containing dissolved impurities in the form of soaps will be separated from the oil.

The distillate is then treated with a solution of a suitable caustic alkali, such as sodium hydroxide, potassium hydroxide or the like, which serves to absorb the phenols present in the oil and such solution with absorbed impurities is then separated from the distillate. The distillate is then agitated with a suitable acidic material, such as sulphuric acid up to 80% $H_2SO_4$, but depending on the distillate treated the concentration of $H_2SO_4$ may vary from 25% $H_2SO_4$ up to 80% $H_2SO_4$, so that this step of the process may be referred to as treatment with a dilute sulphuric acid, preferably about 50% $H_2SO_4$. Such acid treatment has the effect of removing basic impurities, such as nitrogenous bases, and certain undesired color compounds which are removed from the oil upon separation of the acid sludge therefrom.

The thus treated straight run gasoline distillate is then passed through a filter containing a decolorizing clay, such as fuller's earth, or other finely divided contact clay, whereby the last traces of undesired color are removed to leave a finished brilliant gasoline of 30+ color Saybolt and free of all undesirable impurities which may affect the use thereof. With such straight run gasoline distillate the use of a dilute acid is necessary because the use of acid of 80% $H_2SO_4$ concentration will attack certain unsaturates and acid of 93.19% $H_2SO_4$ concentration will attack aromatics, both of which compounds are desired to be left in the distillate.

Fig. 2 is directed to the flow of cracked distillate which is likewise first treated with a solution of a carbonate to remove organic acids then with a solution of caustic alkali to remove the phenols and then with sulphuric acid of a concentration not less than 93.19% $H_2SO_4$, or even fuming sulphuric acid. Such acid treatment is best conducted at a low temperature between 0° F. and 40° F. in any suitable manner which serves to hold down the temperature of reaction while absorbing the bases and undesirable unsaturates, lowering the sulphur content, and minimizing the losses.

After the acid sludge has been removed, the cracked distillate is neutralized with a suitable alkaline solution, sweetened if necessary with doctor solution and filtered through an adsorbent clay to remove the last traces of color and provide a finished gasoline.

Fig. 3 is directed to the treatment of either a kerosene distillate, or the extract resulting from treating a kerosene distillate with liquid sulphur dioxide in a well known manner to absorb impurities therefrom and separating the $SO_2$ from the extract. The kerosene distillate, or the kerosene extract, is likewise first treated with a solution of a carbonate to remove organic acids, then with a solution of caustic alkali to remove phenols and then may be treated in either of two ways. First, the material may be treated with sulphuric acid of not less than 93.19% concentration, or even fuming sulphuric acid, then neutralized with an alkaline solution, then filtered through an adsorbent clay, or, second, the material may be treated with a dilute sulphuric acid of not more than 80% concentration (in case the nitrogenous bases are desired to be removed separately, then with a solvent such as alcohol, glacial acetic acid, or the like, which has the function of removing certain dye-like bodies which show a red color in acid solutions and yellow in alkaline solutions. These dye-like bodies are difficultly removable with concentrated H2SO4, but remain in the oil after treatment with dilute H2SO4, being evidently in the first place combined in some manner with the bases, because the bases may be removed by the dilute acid treatment while the dye substances remain in the oil.

After the solvent reaction, the distillate is treated with concentrated sulphuric acid, neutralized and filtered through clay as in the first described treatment. These steps give a desired series of treatments whereby different by-products of value may be separately removed and recovered for use while the ultimate product is a finished oil.

In Fig. 4, the treatment of a gas oil for special uses is illustrated, for instance in preparing the same for charging stock in cracking stills where a resulting cracked product free from impurities may be recovered.

In this case, a treatment first with carbonate solution removes organic acids, a following treatment with a solution of caustic alkali removes the phenols and a treatment with dilute sulphuric acid of not more than 80% concentration removes nitrogenous bases. This insures that all the impurities removed will not be present in the recovered cracked distillates in the first place, prevents cracking of the impurities in the second place, and third saves corrosion and degeneration of the cracking apparatus.

Fig. 5 shows the flow of a lubricating distillate which may be first diluted with a lighter fraction, such as gasoline, or kerosene distillate, to reduce viscosity and get thorough reaction, and then subjected to treatment with a solution of a carbonate to remove organic acids, then with a solution of caustic alkali to remove phenols, then with sulphuric acid of a concentration of not less than 93.19% or even fuming sulphuric acid, neutralized with an alkaline solution, dewaxed if necessary, then mixed with an alkaline material and clay, or an alkaline clay material and distilled.

The formation of such mixture of alkaline material, clay, and oil, before distillation, is necessary because certain compounds remain in the oil after acid treatment and neutralization which break down under the heat of distillation to form deleterious acid compounds, which compounds are neutralized in the presence of the alkaline clay.

The mixture is distilled either by taking an overhead comprising the diluent and lubricating fractions, which may be separated in any well known manner, and leaving the clay with the heavy oil bottoms, or by heating the mixture to distilling temperatures and passing the heated mixture into a fractionating column whence the diluent passes off as overhead, the lubricating oil may be taken off in the separate fractions, and the residual oil and clay is removed as bottoms.

I claim as my invention:

1. A process of refining oil which comprises: treating a naphthene base oil distillate with a sodium carbonate solution and removing said solution with contained impurities, then with a caustic alkali solution and removing such solution with contained impurities, and then with sulphuric acid and separating out the acid sludge.

2. A process of refining oil which comprises: treating a naphthene base oil distillate with a sodium carbonate solution and removing said solution with contained impurities, then with a caustic alkali solution and removing such solution with contained impurities, and then with concentrated sulphuric acid and separating out the acid sludge.

3. In a process of refining oil the combination of steps which comprise: first treating a naphthene base oil distillate with a sodium carbonate solution to remove organic acids and removing said solution containing said acids, and thereafter treating the distillate with a sodium hydroxide solution to remove phenolic bodies and removing such solution containing said bodies.

4. A process of refining oil which comprises: treating a naphthene base oil distillate with a sodium carbonate solution and removing said solution with contained impurities, then with a caustic alkali solution and removing such solution with contained impurities, then with sulphuric acid and separating out the acid sludge, and filtering the distillate through adsorbent clay.

5. A process of refining oil which comprises: treating a naphthene base oil distillate with a sodium carbonate solution and removing said solution with contained impurities, then with a caustic alkali solution and removing such solution with contained impurities, then with concentrated sulphuric acid and separating out the acid sludge, and filtering the distillate through adsorbent clay.

6. The process of refining oil which comprises: diluting a naphthene base lubricating oil stock with a lighter hydrocarbon, treating the mixture with sodium carbonate solution and removing said solution with contained impurities, then with sodium hydroxide solution and removing such solution with contained impurities, then with concentrated sulphuric acid and separating out the acid sludge, adding an alkaline clay, distilling the mixture, and separately recovering the diluent and refined lubricating oil.

SUMNER E. CAMPBELL.